United States Patent [19]
Meyer

[11] Patent Number: 6,149,232
[45] Date of Patent: *Nov. 21, 2000

[54] VEHICLE SEAT WITH HEAD SUPPORT

[75] Inventor: Thomas Meyer, Amberg, Germany

[73] Assignee: Grammer AG, Amberg, Germany

[*] Notice: This patent is subject to a terminal disclaimer.

[21] Appl. No.: 09/354,705

[22] Filed: Jul. 16, 1999

[30] Foreign Application Priority Data

Aug. 26, 1998 [DE] Germany .......................... 198 38 721

[51] Int. Cl.⁷ ...................................... B60N 2/42
[52] U.S. Cl. ................. 297/216.12; 297/216.13; 297/216.14
[58] Field of Search .................. 297/216.12, 216.13, 297/216.14

[56] References Cited

U.S. PATENT DOCUMENTS

| | | | |
|---|---|---|---|
| 5,484,189 | 1/1996 | Patterson | 297/216.12 |
| 5,927,804 | 7/1999 | Cuevas | 297/216.13 |
| 5,934,750 | 8/1999 | Fohl | 297/216.12 |

*Primary Examiner*—Anthony D. Barfield
*Attorney, Agent, or Firm*—Elliot M. Olstein; Raymond J. Lillie

[57] ABSTRACT

In a vehicle seat having a backrest portion and a head support carried on the backrest portion by a connecting member, to reduce whiplash risk by forward displacement of the head support into a more effective head-supporting position, a displacement member is movably carried on the backrest portion of the seat. The displacement member has a sliding guide arrangement on which the head support connecting member is so guided that displacement of the displacement member in the transverse direction of the seat causes displacement of the head support forwardly of the seat. The displacement member is connected for displacement thereof to a resilient, mechanically stressable drive element activatable by a vehicle-specific acceleration sensor, for release and relief of the drive element to displace the head support.

11 Claims, 2 Drawing Sheets

VEHICLE SEAT WITH HEAD SUPPORT

FIELD OF THE INVENTION

The invention generally concerns a vehicle seat and more specifically a vehicle seat including a head support.

BACKGROUND OF THE INVENTION

A typical form of vehicle seat with head support mounted thereon comprises a seat portion or squab and a backrest portion with a head support which is mounted to the upper edge of the backrest portion by a suitable form of connecting arrangement. It will be appreciated that, while that is a generally typical basic configuration for a vehicle seat with a head support, there are many different variations on that theme, resulting in a wide range of different structural configurations.

As the head of a seat occupant is usually disposed at a spacing from the head support of the vehicle seat, it has been found that, in particular with collision impact speeds of up to about 15 kph, there is the danger of the occurrence of the injury usually referred to as whiplash trauma involving a shearing loading being applied to individual cervical vertebrae. In order to at least obviate such whiplash injury, it is possible to integrate into the head support of the vehicle seat a structure in the nature of an air bag in order to provide for forward displacement of the head support in relation to the vehicle seat in the event of a collision or impact situation in the tail region of the respective vehicle in which the vehicle seat is fitted. Integrating an arrangement of that kind into the head support however suffers from the disadvantage that the head support is effectively no longer an autonomous or self-contained unit and therefore cannot be easily removed from the backrest of the vehicle seat, or that the shape of the head support is correspondingly influenced or indeed impaired by virtue of the integration of the air bag arrangement.

SUMMARY OF THE INVENTION

An object of the present invention is to provide a vehicle seat having a head support, in which the head support is adapted to be displaced forwardly as in the event of a collision situation in the tail region of the corresponding vehicle, using simple means.

Another object of the present invention is to provide a vehicle seat with an actively operable head support which is adapted to be moved into an operative position for supporting the head of the occupant of the vehicle seat in a likely whiplash-inducing situation, wherein the head support is an autonomous unit and is thus removable if required from the backrest.

A further object of the invention is to provide a vehicle seat incorporating a head support displaceable into an actively head-supporting position in a controlled manner while affording rapid response to an event triggering displacement of the head support.

In accordance with the principles of the present invention the foregoing and other objects are attained by a vehicle seat having a backrest portion and a head support which is mounted to the backrest portion by connecting means. Provided movably on the backrest portion is a displacement means including a sliding guide or control means on which the head support connecting means is guided in such a way that displacement of the displacement means in the transverse direction of the vehicle seat produces displacement of the head support forwardly in the longitudinal direction of the seat. For displacement of the displacement means, the displacement means is connected to a resilient, mechanically stressable actuating or drive element. For release and relief thereof, the drive element, is connected to an acceleration sensor device which is particular or specific to the vehicle in which the vehicle seat is fitted.

As will be seen from a description hereinafter of a preferred embodiment of the vehicle seat according to the invention, the provision of the displacement means with the sliding guide or control means and the resilient, mechanically stressable actuating or drive element for displacement of the displacement means in relation to the backrest portion after release and relief of the drive element affords the advantage that the head support is a self-contained structure and consequently can also be removed if necessary from the backrest portion of the motor vehicle seat. That may be required for example when the vehicle seat is being fitted into the vehicle for which it is intended. The head support of the vehicle seat according to the invention can be adjustable in respect of height in relation to the backrest portion manually or by motor means. The drive element for displacement of the displacement means in the transverse direction of the vehicle seat and thus for producing the displacement of the head support forwardly in the longitudinal direction of the seat may include at least one spring element connected to an arresting and release or triggering means which is connected to the vehicle-specific acceleration sensor device. The vehicle-specific acceleration sensor device is for example a unit which can be referred to as a crash sensor, as is used for example in relation to belt tensioners or air bags in vehicles.

In a preferred feature of the invention the arresting and release means can be an electromagnetic means, for example being an electromagnetic relay or a relay circuit. Alternatively the arresting and release means may also be an electromechanical means. This for example may involve a thread or string element comprising a fusible material and surrounded by a heating coil. If the heating coil is activated for example in the event of a crash, so that an electric current flows through the heating coil to cause the thread element to melt, the resulting melting of the thread element causes it to break or yield so that the resilient mechanically stressed drive element can experience relief and can displace the displacement means.

While the above-indicated arresting and release means involve devices which are not reversible or which are only limitedly reversible, it is also possible in accordance with another preferred feature of the invention for the arresting and release means to comprise for example a piezoceramic device. This advantageously involves a reversible device, that is to say a device which can be readily used repeatedly.

In a preferred feature of the vehicle seat according to the invention the displacement means may have a plate element which is disposed at the upper end part of the backrest portion, in such a way as to be linearly movable in the transverse direction of the backrest portion. The connecting means may comprise first and second spaced-apart bar or rod elements and the plate element of the displacement means can be formed with first and second mutually separate sliding guide slots forming the sliding guide or control means and through which the two bar or rod elements extend. A suitable design configuration of the two sliding guide slots makes it possible easily to arrive at simple establishment of the kinematics involved, that is to say the displacement travel of the head support in a forward direction as well as the speed or acceleration of the displacement movement, that is to say its aggressiveness.

In accordance with a further preferred feature of the invention the sliding guide slots may have an active displacement end portion with a detent or retaining means for fixing the forwardly displaced bar or rod elements with the head support. Such a design configuration can afford the advantage that the forwardly displaced head support is secured in its forwardly displaced position, and that is preferable from safety points of view.

In order to prevent unwanted, limited movements of the displacement means in its inactive position, that is to say its position in which it has not been triggered by the resilient drive element, in accordance with another preferred feature of the invention the plate element can be held fast in its normal inactive position by means of a holding element. That holding element can be for example a shear pin extending into a hole or opening in the plate element. If the plate element is accelerated by means of the resilient drive element to displace the head support forwardly in the longitudinal direction of the vehicle seat, then the holding element formed by the shear pin is sheared off and the plate element is moved linearly, as described above. In order to facilitate shearing of the shear pin or to achieve a defined shearing characteristic, the shear pin can be provided for example with a weakened location thereon at which shearing rupture thereof is intended to occur. It may be appropriate for the same purpose for the hole or opening in the plate element to be formed with a shearing edge.

In accordance with another preferred feature of the -invention, in the vehicle seat according to the invention it has been found desirable if the resilient drive element is provided for activation within a time interval of between about 50 and 60 msec at a maximum with a vehicle collision speed of up to about 15 kph. That can be readily achieved by a resilient drive element with at least one spring element of a suitable spring rate.

It is known from accident analysis procedures, sledge tests with dummies and from actual collisions that a head support must be activated within the time of between about 50 and 60 msec at a maximum with a vehicle collision speed of up to about 15 kph in order to afford optimum effect. Upon activation of the resilient drive element the displacement means is linearly displaced in the transverse direction of the seat. When that happens, the head support is moved forwardly in the longitudinal direction of the seat, by virtue of the action of the sliding guide (Dr control means. The head support is then fixed in its forwardly displaced limit position by the above-mentioned detent or retaining means of the sliding guide means.

Further objects, features and advantages of the present invention will be apparent from the description hereinafter of a preferred embodiment thereof.

DESCRIPTION OF THE PREFERRED EMBODIMENT

Figure 1:
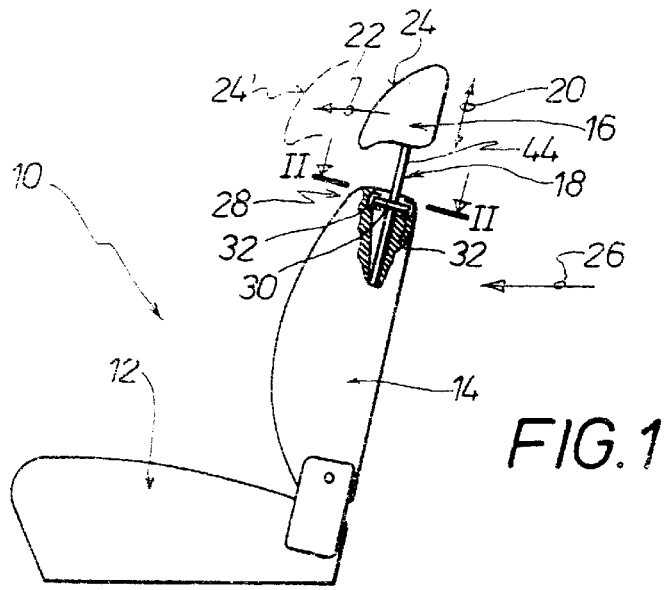
FIG. 1 is a partly sectional side view of a vehicle seat according to the invention.

Referring firstly to FIG. 1, shown therein in diagrammatic form is a vehicle seat 10 comprising a seat portion or squab 10 from which a backrest portion 14 extends generally upwardly. The backrest portion 14 is shown partially in section in FIG. 1.

Disposed on the backrest portion 14 at the upper end thereof in FIG. 1 is a head support 16 which is mounted to the backrest portion 14 by way of a suitable connecting means generally indicated diagrammatically at 18. The head support 16 is preferably mounted adjustably in respect of height on the backrest portion 14. That heightwise adjustability is indicated by the double-headed arrow 20 in FIG. 1. The head support 16 is also displaceable forwardly in the longitudinal direction of the seat, that is to say in a direction which is parallel to the longitudinal axis of a vehicle in which the vehicle seat 10 is fitted. That forward displacement of the head support 16 is indicated by an arcuate arrow 22 in FIG. 1. The head support 16 or more specifically the front outline 24 thereof is indicated by a thin broken line 24' in the forwardly displaced position of the head support. That forward displacement of the head support 16 occurs in a vehicle collision situation indicated by arrow 26, wherein the vehicle in which the vehicle seat 10 is fitted has been impacted in the rear, causing forward acceleration of the vehicle seat 10.

Figure 2:
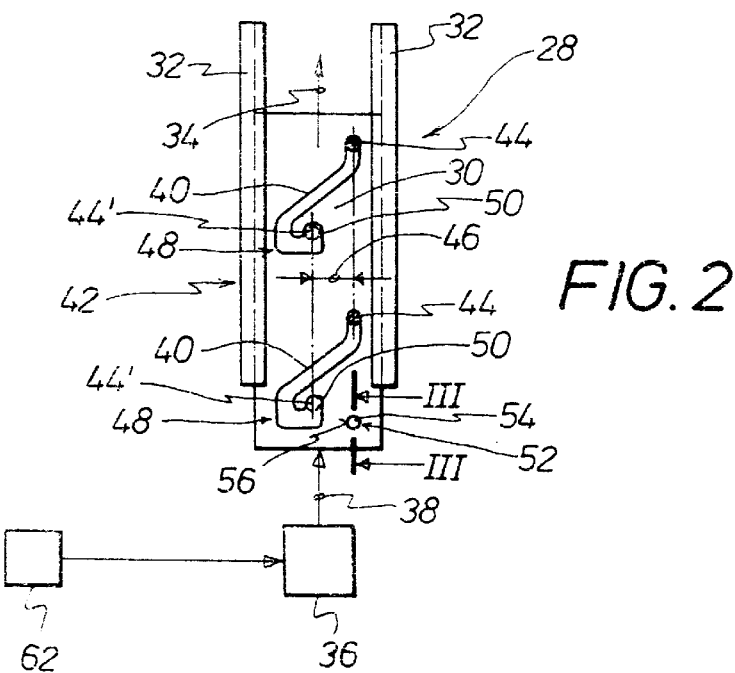
FIG. 2 is a view in section taken along section line II—II in FIG. 1 on an enlarged scale.

As can also be seen from FIG. 2, provided on the backrest portion 14 is a displacement means diagrammatically indicated in FIG. 1 at 28. The structure of the displacement means 28 can be more clearly seen from FIG. 2 from which it will be apparent that the displacement means 28 includes a plate element 30. The plate element 30 is disposed on a guide arrangement 32 linearly displaceably in the transverse direction of the vehicle seat, that is to say, in transverse relationship with respect to the longitudinal direction of the seat or the longitudinal center line of the vehicle, as referred to hereinbefore. The displacement of the plate element 30 is indicated by arrow 34 in FIG. 2.

Linear displacement of the plate element 30 of the displacement means 28 is effected by a resilient, mechanically stressed actuating or drive element 36 which is diagrammatically indicated by a block in FIG. 2. The operative connection between the drive element 36 and the plate element 30 of the displacement means 28 is indicated in FIG. 2 by the arrowed line 38.

The plate element 30 of the displacement means 28 is formed with first and second shaped sliding guide or control slots 40 of the respective configuration shown in FIG. 2, which form a sliding guide or control means 42 for the displacement means 28. The connecting means 18 for connecting the head support 16 to the backrest portion 14 has first and second spaced-apart rod or bar elements indicated at 44, which extend through the slots 40 in the plate element 30 of the displacement means 28. In FIG. 2 the two bar or rod elements 44 of the connecting means 18 are shown diagrammatically in solid lines and with hatching in their normal inactive position and in thin broken lines, at the positions indicated by reference 44', after corresponding activation of the drive element 36, in their active position in which the head support has thus been displaced forwardly, being therefore the position indicated in FIG. 1 by the forwardly displaced front outline referenced 24' of the head support 16. Therefore, depending on the configuration of the slots 40 and the cam control effect afforded thereby, this arrangement provides for a given forward displacement movement of the head support 16 which is indicated by double-headed arrow 46 in FIG. 2. It will be appreciated that the cam control configuration of the slots 40 also affords the desired 'aggressiveness' in terms of the forward displacement of the head support in the longitudinal direction of the seat, as indicated by the arcuate arrow 22 in FIG. 1.

So that the head support 16 can be fixed in the forwardly displaced position corresponding to the front outline indicated at 24' thereof in FIG. 1, the slots 40 each have an active displacement end part 48 formed with a detent or retaining portion 50. It will be seen therefore that each slot 40 comprises a first end part in which the bar elements 44 are disposed in the inactive position of the head support 16, an inclined central part which implements forward displacement of the head support 16, a return part which extends from the inclined central part back towards a notional line joining the bar elements 44 when in the first-mentioned end part of the respective slots 40, and the retaining end part indicated at 50.

In order to hold the plate element 30 of the displacement means 28 fast in its normal inactive position and in order for example to prevent rattling or shaking movements or the like of the plate element 30, the arrangement may further include a holding element indicated at 52.

Figure 3:
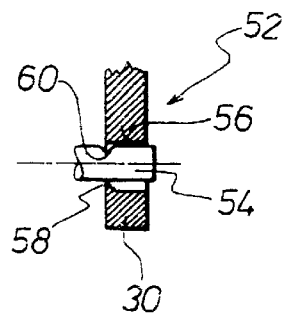
FIG. 3 is a view in section taken along section line III—III in FIG. 2 on a further enlarged scale.

Referring now also to FIG. 3, the holding element 52 can be formed by a shear pin 54 of which a portion is shown in FIG. 3 and which extends into a hole or opening 56 in the plate element 30 of the displacement means 28. The hole or opening 56 in the plate element 30 can be formed with a shearing edge 58 and the shear pin 54 can be formed with a defined weakened location 60 at which it is intended to involve shearing rupture, in order to facilitate the shear pin 54 being sheared off when the resilient drive element 36 is activated. Activation of the drive element 36 in FIG. 2, that is to say release and mechanical relief or expansion of the resilient mechanically biased drive element 36, is implemented by means of a vehicle-specific acceleration sensor device which, like the drive element 36, is diagrammatically indicated by a block 62 in FIG. 2, for example a crash sensor.

Figure 4:
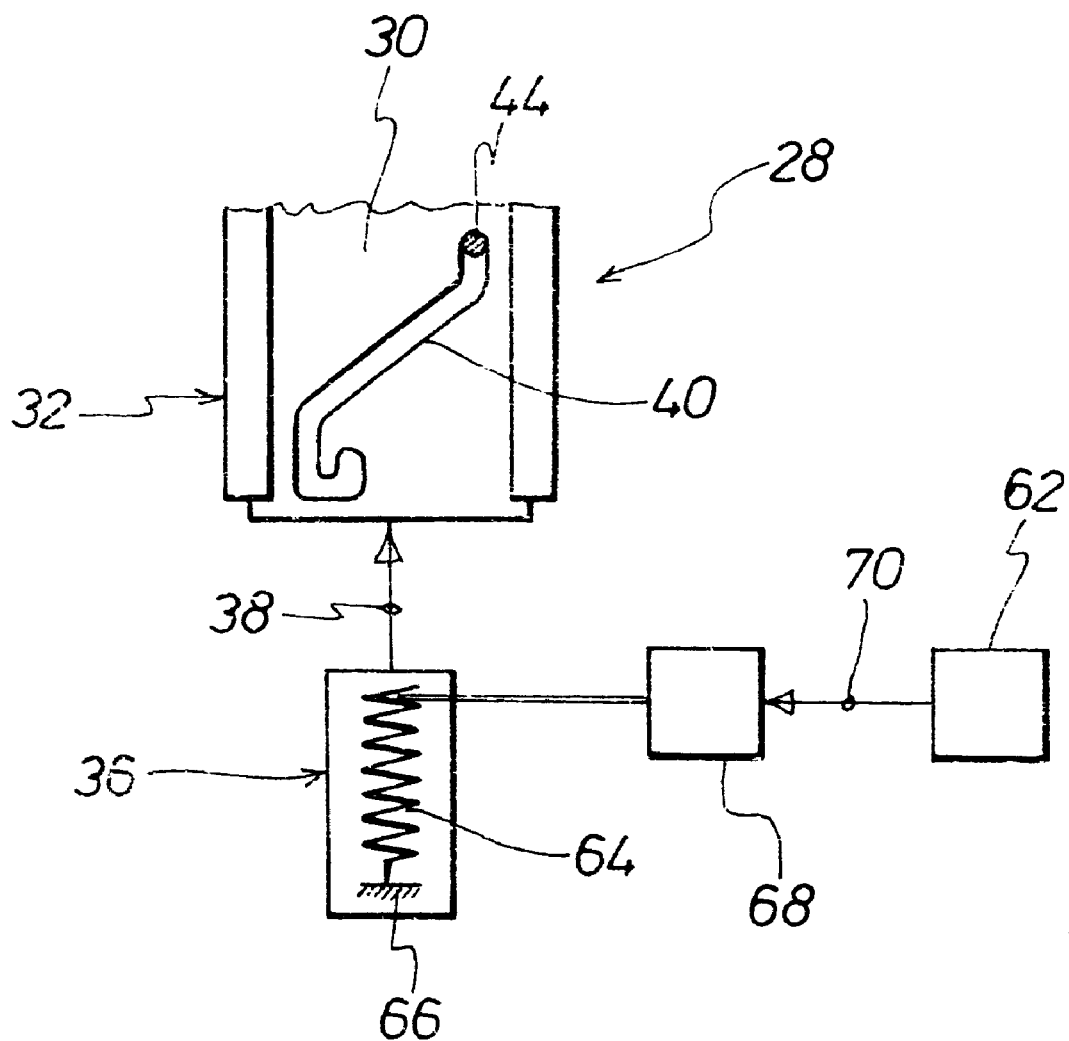
FIG. 4 is a detail from FIG. 3 to show the arresting and release means combined with the resilient, mechanically stressable drive element.

Reference will now be made to FIG. 4 showing a part of the displacement means 28 which is shown in greater detail in FIG. 2, wherein FIG. 4 shows the plate element 30 which is linearly movably guided along the guide arrangement 32. The plate element 30 of the displacement means 28 is operatively connected to a resilient, mechanically stressed drive element 36. That operative connection is indicated by arrow 38.

The plate element 30 is provided with the sliding guide or control slots as indicated at 40, which have already been described hereinbefore with reference to FIG. 2, only one thereof being shown in FIG. 4. A rod or bar element indicated at 44 extends through the respective slot 40 illustrated.

The resilient, mechanically stressed drive element 36 includes at least one spring element 64 which is shown in the form of a coil spring and which is disposed stationarily at one end, being the lower end in FIG. 4, as indicated by reference numeral 66. Provided at the other end of the mechanically stressed spring element 64 of the resilient drive element 36 is an arresting and release or triggering device 68, by means of which the at least one spring element 64 is held firm in a mechanically stressed operative condition of readiness. The arresting and release device 68 can be of any suitable nature and can be for example an electromechanical, electromagnetic or piezoceramic device. The device 68 is operatively connected to the above-mentioned vehicle-specific acceleration sensor device 62 by connecting means diagrammatically indicated by an arrow 70. When the sensor device 62 detects a crash situation the arresting and release device 68 is activated in such a way that the at least one mechanically stressed spring element 64 of the resilient drive element 36 can experience relief and expansion. Accordingly, the spring element 64 shown in the form of a compression coil spring expands and extends in its lengthwise direction. That causes the plate element 30 to be displaced along the guide arrangement 32, and thus each bar or rod element 44 is correspondingly displaced along its associated slot 40. That therefore results in the required movement of the head support 16 in relation to the backrest portion 14.

It will be seen from the foregoing description of the structure of the vehicle seat according to the invention that, upon activation of the drive element 36, the displacement means 28 is linearly displaced in the transverse direction of the seat. When that happens, the sliding cooperation of the bar elements 44 supporting the head support 16 and the sliding guide slots 40 causes the head support 16 to be moved forwardly in the longitudinal direction of the seat with a vigorous but controlled movement. The head support 16 is then secured in its forwardly displaced limit position by virtue of the latching engagement of the bar elements 44 in the retaining end parts 50 of the respective slots 40.

The vehicle seat according to the invention has the considerable advantage that the usual problems involved with the phenomenon known as 'out-of-position', as occurs for example by virtue of a head bearing against the head support, are eliminated by the relatively low displacement speeds and by virtue of the provision of a suitable 'sloop curve' in respect of the drive element 36. More specifically, if the head of a seat occupant is bearing against the head support during normal travel of the vehicle, there would be a corresponding increase in the levels of mass inertia by about three times so that the spring effect output of the drive element would no longer suffice to accelerate those increased masses, that is to say the sum of the mass of the head support and the mass of the head of the seat occupant, in an injury-typical situation.

The vehicle seat according to the invention provides that the number of parts and components thereof can be reduced to a minimum and they move along simple paths of motion. The configuration of the sliding guide means of the displacement arrangement of the vehicle seat according to the invention can be easily matched to the various possible demands such as for example the displacement travel of the head support in a forward direction and the degree of aggressiveness involved in such displacement, as already indicated above. Further advantages are that the drive element is disposed in the backrest portion of the seat so that, in the event of faulty triggering or in the event of damage to the drive element, there is no direct risk to the seat occupant. The drive element 36 forms what is in effect a closed or self-contained system, which is advantageous from assembly points of view. Furthermore, as also already indicated above, the vehicle seat according to the invention provides that the head support is a self-contained and autonomous unit and consequently if necessary can also be removed from the vehicle seat backrest portion. The invention does not involve any limiting factors in regard to the shape and configuration of the head support which can thus be of the form that is most suited to its purpose. The head support of the vehicle seat according to the invention can also be adjustable in terms of height as required. That heightwise adjustment may involve manual or automatic adjustment, the latter constituting an important safety gain.

It will be appreciated that the above-described embodiment of the invention has been set forth solely by way of example and illustration of the principles thereof and that various modifications and alterations may be made therein without thereby departing from the spirit and scope of the invention.

What is claimed is:

1. A vehicle seat including a backrest portion, a head support, connecting means mounting the head support to the backrest portion, a displacement means movable on the backrest portion, the displacement means comprising a sliding guide means guiding the head support connecting means and operable to produce displacement of the head support forwardly in the longitudinal direction of the seat in response to displacement of the displacement means in the transverse direction of the vehicle seat, and a resilient mechanically stressable drive means operatively connected to the displacement means for displacement thereof, the drive means being connected to a vehicle-specific acceleration sensor means for release and relief of the drive means.

2. A vehicle seat as set forth in claim 1 wherein the backrest portion has an upper end part, and said displacement means includes a plate element, and means mounting said plate element to said upper end part of said backrest portion linearly movably in the transverse direction thereof.

3. A vehicle seat as set forth in claim 2 wherein said connecting means includes first and second spaced-apart bar elements, and wherein said plate element of said displacement means has first and second mutually separate sliding guide slots which form said sliding guide means and through which said bar elements extend.

4. A vehicle seat as set forth in claim 3 wherein said sliding guide slots have an active displacement end part with a detent configuration for fixing the position of said bar elements with said head support after forward displacement thereof.

5. A vehicle seat as set forth in claim 2 and further including:

a holding means for holding said plate element fast in the normal inactive position of said plate element when said drive means is not activated.

6. A vehicle seat as set forth in claim 5 wherein said plate element has an opening therein and said holding means includes a shear pin extending into said opening in said plate element.

7. A vehicle seat as set forth in claim 1 wherein said drive means is operable for activation within a time of between about 50 and 60 msec at a maximum at a vehicle collision speed of up to about 15 kph.

8. A vehicle seat as set forth in claim 1 wherein the resilient drive means includes at least one spring element and further including an arresting and release means, means connecting the arresting and release means to the spring element, and means connecting the arresting and release means to said acceleration sensor means.

9. A vehicle seat as set forth in claim 8 wherein the arresting and release means is an electromechanical means.

10. A vehicle seat as set forth in claim 8 wherein the arresting and release means is an electromagnetic means.

11. A vehicle seat as set forth in claim 8 wherein the arresting and release means is a piezoceramic means.

* * * * *